(12) United States Patent
Qu

(10) Patent No.: US 11,120,617 B2
(45) Date of Patent: Sep. 14, 2021

(54) METHOD AND APPARATUS FOR SWITCHING PANORAMIC SCENE

(71) Applicant: BAIDU ONLINE NETWORK TECHNOLOGY (BEIJING) CO., LTD., Beijing (CN)

(72) Inventor: Da Qu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/031,228

(22) Filed: Sep. 24, 2020

(65) Prior Publication Data

US 2021/0217224 A1     Jul. 15, 2021

(30) Foreign Application Priority Data

Jan. 9, 2020  (CN) .......................... 202010022299.6

(51) Int. Cl.
*G06T 15/20*     (2011.01)
*G06T 3/00*      (2006.01)

(52) U.S. Cl.
CPC ............ *G06T 15/20* (2013.01); *G06T 3/0062* (2013.01)

(58) Field of Classification Search
CPC ............................. G06T 15/20; G06T 3/0062
See application file for complete search history.

(56) References Cited

U.S. PATENT DOCUMENTS

| | | | |
|---|---|---|---|
| 9,185,287 B2* | 11/2015 | Sento | G03B 37/04 |
| 10,102,611 B1* | 10/2018 | Murtha | G06T 15/20 |
| 10,627,628 B2* | 4/2020 | Shinohara | G06F 3/01 |
| 2012/0257006 A1* | 10/2012 | Matsumoto | G03B 37/04 |
| | | | 348/36 |
| 2017/0078654 A1* | 3/2017 | Facin | G06F 3/04815 |
| 2020/0202597 A1* | 6/2020 | Stokking | G06T 15/20 |

* cited by examiner

*Primary Examiner* — David T Welch
(74) *Attorney, Agent, or Firm* — Novick, Kim & Lee, PLLC; Zhi Yang Xue; Jihun Kim

(57) ABSTRACT

A method for switching a panoramic scene includes: obtaining a first panoramic model of a current scene; obtaining panoramic model information of a target scene, and generating a second panoramic model of the target scene based on the panoramic model information; and obtaining a scene switching direction and a preset distance, and controlling a switch from the first panoramic model to the second panoramic model based on the scene switching direction and the preset distance, for displaying the target scene.

12 Claims, 3 Drawing Sheets

METHOD AND APPARATUS FOR SWITCHING PANORAMIC SCENE

FIELD

The present disclosure relates to a field of image processing technologies and more particularly to a field of panoramic scene technologies, and provides a method and an apparatus for switching a panoramic scene.

BACKGROUND

Panoramic display may be performed based on a reality image. For example, a panoramic scene is displayed in a form of a three-dimensional model, such that a user may preview the panoramic scene from any angle. The panoramic display may bring an experience as on the scene to the user.

In the related art, a panoramic image is generally mapped into a panoramic model, and scene switching is performed by replacing a panoramic image material and re-mapping the panoramic image. In this way, the scene switching is unnatural and the display effect needs to be improved.

SUMMARY

The present disclosure aims to solve at least one of the technical problems in the related art to some extents.

A first aspect of embodiments of the present disclosure provides a method for switching a panoramic scene. The method includes: obtaining a first panoramic model of a current scene; obtaining panoramic model information of a target scene, and generating a second panoramic model of the target scene based on the panoramic model information; and obtaining a scene switching direction and a preset distance, and controlling a switch from the first panoramic model to the second panoramic model based on the scene switching direction and the preset distance, for displaying the target scene.

A second aspect of embodiments of the present disclosure provides an apparatus for switching a panoramic scene. The apparatus includes at least one processor and a memory. The memory is communicatively coupled to the at least one processor. The memory is configured to store instructions executable by the at least one processor. When the instructions are executed by the at least one processor, the at least one processor is configured to: obtain a first panoramic model of a current scene; obtain panoramic model information of a target scene, and generate a second panoramic model of the target scene based on the panoramic model information; and obtain a scene switching direction and a preset distance, and control a switch from the first panoramic model to the second panoramic model based on the scene switching direction and the preset distance, for displaying the target scene.

A third aspect of embodiments of the present disclosure provides a non-transitory computer readable storage medium having computer instructions stored thereon. The computer instructions are configured to cause a computer to execute the method for switching the panoramic scene according to the first aspect of embodiments.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding, and should be regarded as merely exemplary. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Figure 1:
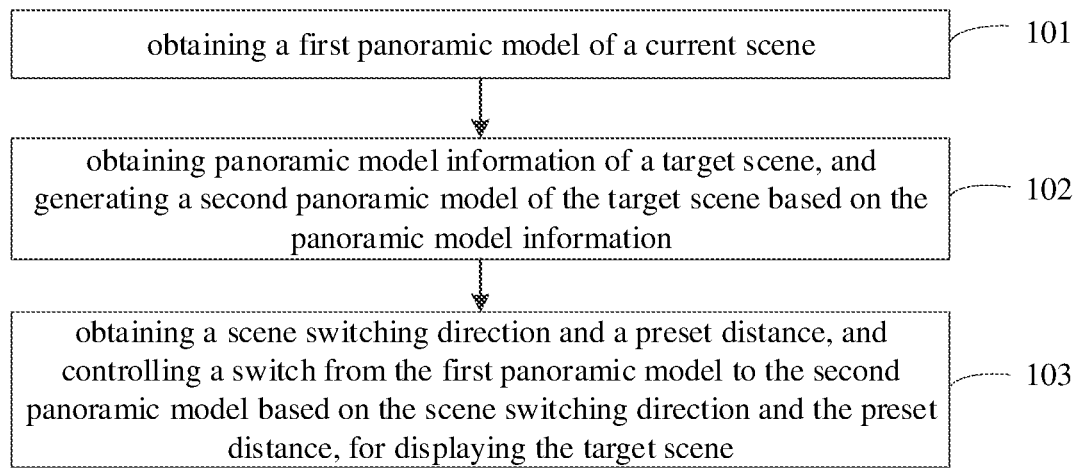
FIG. 1 is a flow chart illustrating a method for switching a panoramic scene according to an embodiment of the present disclosure.

FIG. 1 is a flow chart illustrating a method for switching a panoramic scene according to an embodiment of the present disclosure. As illustrated in FIG. 1, the method includes the following.

At block 101, a first panoramic model of a current scene is obtained.

In an actual application, there may be a condition where one panoramic scene is switched to another panoramic scene when a panoramic image is displayed by a panoramic model. In this embodiment, the current scene may be determined firstly, and mapping may be performed based on the panoramic image of the current scene to generate the first panoramic model of the current scene, and then the current scene may be displayed by the first panoramic model. Thus, the first panoramic model of the current scene is obtained firstly when scene switching is performed. The first panoramic model includes a panoramic ball model.

At block 102, panoramic model information of a target scene is obtained, and a second panoramic model of the target scene is generated based on the panoramic model information.

In this embodiment, a target scene that needs to be switched to is determined, the panoramic model information of the target scene is obtained, and the second panoramic model of the target scene is generated based on the panoramic model information. The panoramic model information includes texture map information, a default perfect angle and so on. The second panoramic model includes a panoramic ball model. For example, a panoramic image of the target scene is obtained, and then a correspondence between a vertex coordinate and a texture coordinate is obtained. The panoramic image of the target scene is mapped into the model based on the correspondence to generate the second panoramic model.

In an embodiment of the present disclosure, in order to avoid affecting the display effect of the current scene before the scene switching, a transparency of the second panoramic model is adjusted and the second panoramic model is controlled to be in an invisible state after the second panoramic model is generated based on the panoramic model information. Alternatively, the first panoramic model and the second panoramic model may overlap with each other.

At block 103, a scene switching direction and a preset distance are obtained, and a switch from the first panoramic model to the second panoramic model is controlled based on the scene switching direction and the preset distance to display the target scene.

In this embodiment, a distance D is preset, and the scene switching direction is obtained. 0→D distance animation is performed on the current scene and D→0 distance animation is performed on the target scene based on the scene switching direction, and the first panoramic model is switched to the second panoramic model, such that the target scene is displayed based on the second panoramic model.

In an embodiment of the present disclosure, controlling the switch from the first panoramic model to the second panoramic model based on the scene switching direction and the preset distance includes: obtaining a first viewpoint of the first panoramic model and a second viewpoint of the second panoramic model, controlling the first viewpoint to move the preset distance along a direction opposite to the scene switching direction, and controlling the first panoramic model to be converted from a visible state to an invisible state; and while the above action is performed, controlling the second viewpoint to move the preset distance along the scene switching direction, and controlling the second panoramic model to be converted from the invisible state to the visible state. Thus, the switch from the current scene to the target scene is realized, and the smooth shuttle effect is realized when switching from the current scene to the target scene.

In the related art, the panoramic display may be performed by mapping the panoramic image in a created three-dimensional ball model, reusing the same three-dimensional ball model when the scene is switched, and performing the scene switching by replacing a panoramic image material and re-mapping the panoramic image, and thus the scene switching is rather unnatural and the display effect needs to be improved.

With the method for switching the panoramic scene according to embodiments of the present disclosure, the first panoramic model of the current scene is obtained. Then, the panoramic model information of the target scene is obtained, and the second panoramic model of the target scene is generated based on the panoramic model information. Further, the scene switching direction and the preset distance are obtained, and the first panoramic model is switched to the second panoramic model based on the scene switching direction and the preset distance, for displaying the target scene. In this way, when the current scene is switched to the target scene, the shuttle effect may be achieved, the scene switching is smoother, and the panoramic display effect is improved.

Based on the above embodiment, description may be made below with reference to an implementing procedure of the scene switching.

Figure 2:
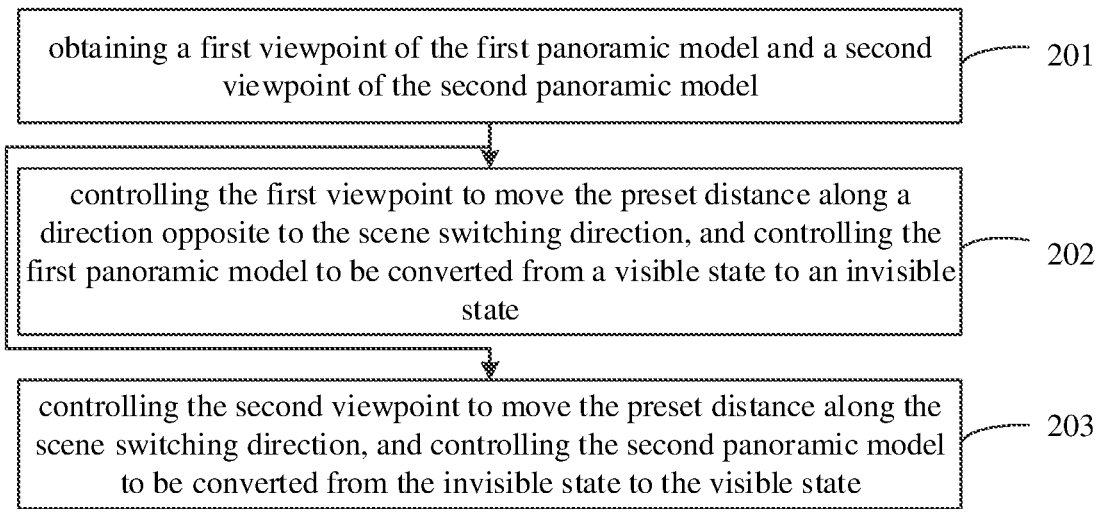
FIG. 2 is a flow chart illustrating a method for switching a panoramic scene according to another embodiment of the present disclosure.

FIG. 2 is a flow chart illustrating a method for switching a panoramic scene according to another embodiment of the present disclosure. As illustrated in FIG. 2, the method includes the following.

At block 201, a first viewpoint of the first panoramic model and a second viewpoint of the second panoramic model are obtained.

In this embodiment, the panoramic models include independent viewpoints. The first panoramic model includes the first viewpoint, and the second panoramic model includes the second viewpoint.

As an example, taking the panoramic ball model as an example, the panoramic image is mapped into a surface of the panoramic ball model. A visual field may be determined based on a viewpoint, a line-of-sight direction and a visual angle of the panoramic ball model. Further, a target area within the visual field in the panoramic ball model may be determined. Further, an image of the target area is projected onto a projection plane by perspective projection, thereby generating a display image. The first viewpoint of the first panoramic model and the second viewpoint of the second panoramic model are obtained firstly when the scene switching is performed.

At block 202, the first viewpoint is controlled to move the preset distance along a direction opposite to the scene switching direction, and the first panoramic model is controlled to be converted from a visible state to an invisible state.

In this embodiment, the preset distance is D, and the scene switching direction is obtained. As an example, since a current display image may be determined based on the parameters such as the viewpoint and the line-of-sight direction of the panoramic ball model, the line-of-sight direction corresponding to the first panoramic model may be obtained when the current scene is displayed by the first panoramic model. The line-of-sight direction is taken as the scene switching direction, and the scene switching is further performed based on the scene switching direction. It should be noted that the scene switching direction may include the line-of-sight direction corresponding to the first panoramic model, or may be set based on specific needs. The first viewpoint is controlled to move the preset distance D along the direction opposite to the scene switching direction, such that the first viewpoint is far away from a projection plane corresponding to the first panoramic model, realizing the effect that the current scene is far away, and the first panoramic model is controlled to be converted from the visible state to the invisible state.

In an embodiment of the present disclosure, controlling the first panoramic model to be converted from the visible state to the invisible state includes: querying a first mapping relationship between a moving distance and a transparency of the first viewpoint, determining a first transparency corresponding to a current moving distance of the first viewpoint based on the first mapping relationship, and adjusting the transparency of the first panoramic model to the first transparency.

As an example, when the moving distance of the first viewpoint is 0, the corresponding transparency is 0%, and when the moving distance of the first viewpoint is D, the corresponding transparency is 100%. The transparency of the first panoramic model is gradually adjusted from 0% to 100% when the first viewpoint is controlled to move from distance 0 to distance D along the direction opposite to the scene switching direction, thereby controlling the first panoramic model to gradually be converted from the visible state to the invisible state and realizing the fade-out effect of the current scene.

At block 203, the second viewpoint is controlled to move the preset distance along the scene switching direction, and the second panoramic model is controlled to be converted from the invisible state to the visible state.

In this embodiment, the preset distance is D, and the scene switching direction is obtained. The second viewpoint is controlled to move the preset distance along the scene switching direction, such that the second viewpoint is close to a projection plane corresponding to the second panoramic model, realizing the effect that the target scene is getting close, and the second panoramic model is controlled to be converted from the invisible state to the visible state. The first viewpoint/second viewpoint may be controlled to move at a constant velocity for the preset distance, and may also be controlled to move at a non-constant velocity, which is not limited here.

In an embodiment of the present disclosure, controlling the second panoramic model to be converted from the invisible state to the visible state includes: querying a second mapping relationship between a moving distance and a transparency of the second viewpoint, determining a second transparency corresponding to a current moving distance of the second viewpoint based on the second mapping relationship, and adjusting the transparency of the second panoramic model to the second transparency.

As an example, when the moving distance of the second viewpoint is 0, the corresponding transparency is 100%, and when the moving distance of the second viewpoint is D, the corresponding transparency is 0%. When the second viewpoint is controlled to move from distance 0 to distance D along the scene switching direction, the transparency of the second panoramic model is gradually adjusted from 100% to 0%, thereby controlling the second panoramic model to be converted from the invisible state to the visible state and realizing the fade-in effect of the target scene.

In this embodiment, the action at block 202 and the action at block 203 may be executed simultaneously. When switching is performed on the panoramic scene, the current scene fades out and moves towards the target scene, and the target scene fades in, thereby realizing the shuttle effect.

With the method for switching the panoramic scene according to embodiments of the present disclosure, the first viewpoint of the first panoramic model and the second viewpoint of the second panoramic model are obtained, the first viewpoint is controlled to move the preset distance along the direction opposite to the scene switching direction, and the first panoramic model is controlled to be converted from the visible state to the invisible state; and the second viewpoint is controlled to move the preset distance along the scene switching direction, and the second panoramic model is controlled to be converted from the invisible state to the visible state. In this way, when the current scene is switched to the target scene, the shuttle effect may be realized, the scene switching is smoother, and the panoramic display effect is improved.

To achieve the above embodiments, the present disclosure also provides an apparatus for switching a panoramic scene.

Figure 3:
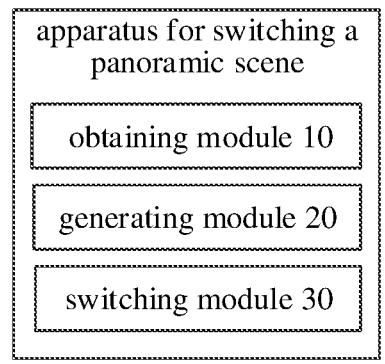
FIG. 3 is a block diagram illustrating an apparatus for switching a panoramic scene according to an embodiment of the present disclosure.

FIG. 3 is a block diagram illustrating an apparatus for switching a panoramic scene according to an embodiment of the present disclosure. As illustrated in FIG. 3, the apparatus includes: an obtaining module 10, a generating module 20, and a switching module 30.

The obtaining module 10 is configured to obtain a first panoramic model of a current scene.

The generating module 20 is configured to obtain panoramic model information of a target scene, and to generate a second panoramic model of the target scene based on the panoramic model information.

The switching module 30 is configured to obtain a scene switching direction and a preset distance, and to control a switch from the first panoramic model to the second panoramic model based on the scene switching direction and the preset distance, for displaying the target scene.

In an embodiment of the present disclosure, the switching module 30 is configured to obtain a line-of-sight direction corresponding to the first panoramic model, and to take the line-of-sight direction as the scene switching direction.

Figure 4:
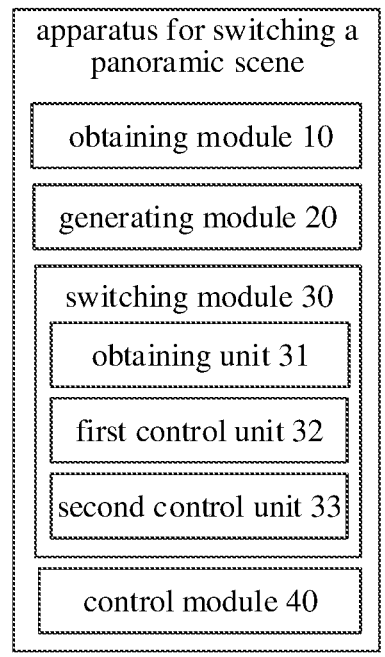
FIG. 4 is a block diagram illustrating an apparatus for switching a panoramic scene according to another embodiment of the present disclosure.

On the basis of FIG. 3, the apparatus illustrated in FIG. 4 further includes a control module 40.

The control module 40 is configured to adjust a transparency of the second panoramic model and to control the second panoramic model to be in an invisible state.

In an embodiment of the present disclosure, the switching module 30 includes: an obtaining unit 31, a first control unit 32, and a second control unit 33. The obtaining unit 31 is configured to obtain a first viewpoint of the first panoramic model and a second viewpoint of the second panoramic model. The first control unit 32 is configured to control the first viewpoint to move the preset distance along a direction opposite to the scene switching direction, and to control the first panoramic model to be converted from a visible state to an invisible state. The second control unit 33 is configured to control the second viewpoint to move the preset distance along the scene switching direction, and to control the second panoramic model to be converted from the invisible state to the visible state.

Alternatively, the first control unit 32 is configured to: query a first mapping relationship between a moving distance and a transparency of the first viewpoint, determine a first transparency corresponding to a current moving distance of the first viewpoint based on the first mapping relationship, and adjust the transparency of the first panoramic model to the first transparency.

The second control unit 33 is configured to: query a second mapping relationship between a moving distance and a transparency of the second viewpoint, determine a second transparency corresponding to a current moving distance of the second viewpoint based on the second mapping relationship, and adjust the transparency of the second panoramic model to the second transparency.

The description for the method for switching the panoramic scene in the previous embodiment is also applicable to the apparatus for switching the panoramic scene in this embodiment, which is not elaborated here.

With the apparatus for switching the panoramic scene according to embodiments of the present disclosure, the first panoramic model of the current scene is obtained. Then, the panoramic model information of the target scene is obtained, and the second panoramic model of the target scene is generated based on the panoramic model information. Further, the scene switching direction and the preset distance are obtained, and the first panoramic model is switched to the second panoramic model based on the scene switching direction and the preset distance, for displaying the target scene. In this way, when the current scene is switched to the target scene, the shuttle effect may be achieved, the scene switching is smoother, and the panoramic display effect is improved.

To achieve the above embodiments, the present disclosure also provides a computer program product. When instructions in the computer program product are executed by a processor, the method for switching the panoramic scene according to any of the above embodiments is implemented.

According to embodiments of the present disclosure, the present disclosure also provides an electronic device and a readable storage medium.

Figure 5:
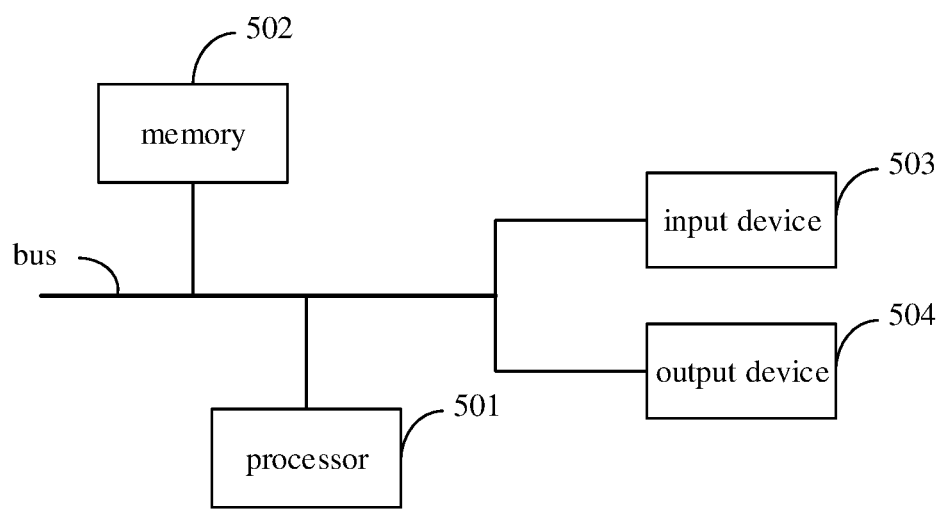
FIG. 5 is a block diagram illustrating an exemplary electronic device capable of implementing embodiments of the present disclosure.

FIG. 5 is a block diagram illustrating an electronic device capable of implementing a method for switching a panoramic scene according to embodiments of the present disclosure. As illustrated in FIG. 5, the electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the present disclosure described and/or claimed herein.

As illustrated in FIG. 5, the electronic device includes: one or more processors 501, a memory 502, and interfaces for connecting various components, including a high-speed interface and a low-speed interface. Various components are connected to each other by different buses, and may be mounted on a public main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (for example, as a server array, a group of blade servers, or a multiprocessor system). In FIG. 5, a processor 501 is taken as an example.

The memory 502 is a non-transitory computer readable storage medium provided by the present disclosure. The memory is configured to store instructions executed by at least one processor, to enable the at least one processor to execute a method for switching a panoramic scene according to the present disclosure. The non-transitory computer readable storage medium according to the present disclosure is configured to store computer instructions. The computer instructions are configured to enable a computer to execute the method for switching the panoramic scene according to the present disclosure.

As the non-transitory computer readable storage medium, the memory 502 may be configured to store non-transitory software programs, non-transitory computer executable programs and modules, such as program instructions/modules (such as, the obtaining module 10, the generating module 20, and the switching module 30 illustrated in FIG. 3) corresponding to the method for switching the panoramic scene according to embodiments of the present disclosure. The processor 501 is configured to execute various functional applications and data processing of the server by operating non-transitory software programs, instructions and modules stored in the memory 502, that is, implements the method for switching the panoramic scene according to the above method embodiment.

The memory 502 may include a storage program region and a storage data region. The storage program region may store an application required by an operating system and at least one function. The storage data region may store data created based on usage of the electronic device. In addition, the memory 502 may include a high-speed random access memory, and may also include a non-transitory memory, such as at least one disk memory device, a flash memory device, or other non-transitory solid-state memory device. In some embodiments, the memory 502 may alternatively include memories remotely located to the processor 501, and these remote memories may be connected to the electronic device through a network. Examples of the above network include, but are not limited to, an Internet, an intranet, a local area network, a mobile communication network and combinations thereof.

The electronic device capable of implementing the method for switching the panoramic scene may also include: an input device 503 and an output device 504. The processor 501, the memory 502, the input device 503, and the output device 504 may be connected through a bus or in other means. In FIG. 5, the bus is taken as an example.

The input device 503 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 504 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some implementation, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with the user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and technologies described herein), or a computing system including any combination of the background component, the middleware component, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact through the communication network. A relationship between the client and the server is generated by computer programs operated on a corresponding computer and having a client-server relationship with each other.

It should be understood that, steps may be reordered, added or deleted by utilizing flows in the various forms illustrated above. For example, the actions described in the present disclosure may be executed in parallel, sequentially or in different orders, so long as desired results of the technical solution disclosed in the present disclosure may be achieved, there is no limitation here.

The above detailed embodiments do not limit the protection scope of the present disclosure. It should be understood by the skilled in the art that various modifications, combinations, sub-combinations and substitutions may be made based on design requirements and other factors. Any modification, equivalent substitution and improvement made within the spirit and principle of the present disclosure shall be included in the protection scope of present disclosure.

What is claimed is:

1. A method for switching a panoramic scene, comprising:
    obtaining a first panoramic model of a current scene;
    obtaining panoramic model information of a target scene, and generating a second panoramic model of the target scene based on the panoramic model information; and
    obtaining a scene switching direction and a preset distance, and controlling a switch from the first panoramic model to the second panoramic model based on the scene switching direction and the preset distance, for displaying the target scene,
    wherein controlling the switch from the first panoramic model to the second panoramic model based on the scene switching direction and the preset distance comprises:
    obtaining a first viewpoint of the first panoramic model and a second viewpoint of the second panoramic model;
    controlling the first viewpoint to move the preset distance along a direction opposite to the scene switching direction, and controlling the first panoramic model to be converted from a visible state to an invisible state; and
    controlling the second viewpoint to move the preset distance along the scene switching direction, and controlling the second panoramic model to be converted from the invisible state to the visible state.

2. The method of claim 1, wherein controlling the first panoramic model to be converted from the visible state to the invisible state comprises:
    querying a first mapping relationship between a moving distance and a transparency of the first viewpoint, determining a first transparency corresponding to a current moving distance of the first viewpoint based on the first mapping relationship, and adjusting a transparency of the first panoramic model to the first transparency, and
    wherein controlling the second panoramic model to be converted from the invisible state to the visible state comprises:
    querying a second mapping relationship between a moving distance and a transparency of the second viewpoint, determining a second transparency corresponding to a current moving distance of the second viewpoint based on the second mapping relationship, and adjusting a transparency of the second panoramic model to the second transparency.

3. The method of claim 1, wherein after generating the second panoramic model of the target scene based on the panoramic model information, the method further comprises:
    adjusting a transparency of the second panoramic model and controlling the second panoramic model to be in the invisible state.

4. The method of claim 1, wherein obtaining the scene switching direction comprises:
    obtaining a line-of-sight direction corresponding to the first panoramic model, and taking the line-of-sight direction as the scene switching direction.

5. An apparatus for switching a panoramic scene, comprising:
    at least one processor; and
    a memory, communicatively coupled to the at least one processor,
    wherein the memory is configured to store instructions executable by the at least one processor, and when the instructions are executed by the at least one processor, the at least one processor is configured to:
    obtain a first panoramic model of a current scene;
    obtain panoramic model information of a target scene, and generate a second panoramic model of the target scene based on the panoramic model information; and
    obtain a scene switching direction and a preset distance, and control a switch from the first panoramic model to the second panoramic model based on the scene switching direction and the preset distance, for displaying the target scene,
    wherein the at least one processor is further configured to:
    obtain a first viewpoint of the first panoramic model and a second viewpoint of the second panoramic model;
    control the first viewpoint to move the preset distance along a direction opposite to the scene switching direction, and control the first panoramic model to be converted from a visible state to an invisible state; and
    control the second viewpoint to move the preset distance along the scene switching direction, and control the second panoramic model to be converted from the invisible state to the visible state.

6. The apparatus of claim 5, wherein the at least one processor is further configured to:
    query a first mapping relationship between a moving distance and a transparency of the first viewpoint, determine a first transparency corresponding to a current moving distance of the first viewpoint based on the first mapping relationship, and adjust a transparency of the first panoramic model to the first transparency; and query a second mapping relationship between a moving distance and a transparency of the second viewpoint, determine a second transparency corresponding to a current moving distance of the second viewpoint based on the second mapping relationship, and adjust a transparency of the second panoramic model to the second transparency.

7. The apparatus of claim 5, wherein after generating the second panoramic model of the target scene based on the panoramic model information, the at least one processor is further configured to:

adjust a transparency of the second panoramic model and control the second panoramic model to be in the invisible state.

8. The apparatus of claim 5, wherein the at least one processor is further configured to:

obtain a line-of-sight direction corresponding to the first panoramic model, and take the line-of-sight direction as the scene switching direction.

9. A non-transitory computer readable storage medium having computer instructions stored thereon, wherein the computer instructions are configured to cause a computer to execute a method for switching a panoramic scene, the method comprising:

obtaining a first panoramic model of a current scene;

obtaining panoramic model information of a target scene, and generating a second panoramic model of the target scene based on the panoramic model information; and obtaining a scene switching direction and a preset distance, and controlling a switch from the first panoramic model to the second panoramic model based on the scene switching direction and the preset distance, for displaying the target scene, wherein controlling the switch from the first panoramic model to the second panoramic model based on the scene switching direction and the preset distance comprises:

obtaining a first viewpoint of the first panoramic model and a second viewpoint of the second panoramic model;

controlling the first viewpoint to move the preset distance along a direction opposite to the scene switching direction, and controlling the first panoramic model to be converted from a visible state to an invisible state; and controlling the second viewpoint to move the preset distance along the scene switching direction, and controlling the second panoramic model to be converted from the invisible state to the visible state.

10. The non-transitory computer readable storage medium of claim 9, wherein controlling the first panoramic model to be converted from the visible state to the invisible state comprises:

querying a first mapping relationship between a moving distance and a transparency of the first viewpoint, determining a first transparency corresponding to a current moving distance of the first viewpoint based on the first mapping relationship, and adjusting a transparency of the first panoramic model to the first transparency, and wherein controlling the second panoramic model to be converted from the invisible state to the visible state comprises:

querying a second mapping relationship between a moving distance and a transparency of the second viewpoint, determining a second transparency corresponding to a current moving distance of the second viewpoint based on the second mapping relationship, and adjusting a transparency of the second panoramic model to the second transparency.

11. The non-transitory computer readable storage medium of claim 9, wherein after generating the second panoramic model of the target scene based on the panoramic model information, the method further comprises:

adjusting a transparency of the second panoramic model and controlling the second panoramic model to be in the invisible state.

12. The non-transitory computer readable storage medium of claim 9, wherein obtaining the scene switching direction comprises:

obtaining a line-of-sight direction corresponding to the first panoramic model, and taking the line-of-sight direction as the scene switching direction.

* * * * *